July 1, 1952  C. E. JOHNSON  2,601,855
POTATO VINER
Filed July 28, 1947

Inventor
Carl E. Johnson
By Clarence A. O'Brien
and Harvey B. Jacobson
Attorneys Patented July 1, 1952

2,601,855

UNITED STATES PATENT OFFICE 2,601,855

POTATO VINER

Carl E. Johnson, Idaho Falls, Idaho

Application July 28, 1947, Serial No. 764,096

1 Claim. (Cl. 130—30)

This invention relates to an improvement of the potato and potato vine separator forming an element of the potato harvesting apparatus set forth in my co-pending application, Serial No. 531,909, filed April 20, 1944, which became Patent No. 2,532,314 on May 12, 1950.

In said co-pending application is disclosed a potato harvesting machine which will not only dig potatoes, but also separate the potatoes from soil, stones, vines, and the like and subsequently bag the potatoes or place them in a wagon or truck, all in a substantially automatic series of operations.

An important object of the present invention is to provide a potato and potato vine separating mechanism which shall be positive in its operation and substantially fool-proof.

A further object of the invention consists in providing a separator mechanism conforming to the preceding object which shall have improved and highly efficient means for separating the potatoes from the vines, and then delivering the separated potatoes to a point for collection of the same.

A further object of the invention is to provide a novel and improved construction for conveying or transporting the potato vines with potatoes attached through the potato separator, removing the potatoes from the vines in a positive and certain manner, and then positively withdrawing the vines from the conveying means, subsequent to the removal of the potatoes therefrom for disposition of the vines in any desired manner.

These, together with various ancillary objects of the invention, which will later become apparent as the following description proceeds, are attained by this device, a preferred embodiment of which has been illustrated, by way of example only, in the accompanying drawings, wherein.

Figure 1:
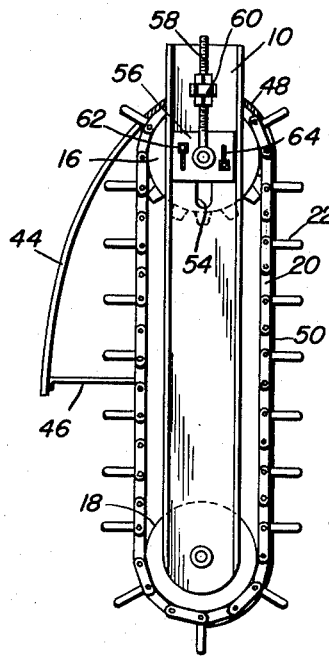
Figure 1 is a side elevational view of the preferred embodiment of the potato and vine separator.

Referring now more specifically to the attached drawings, wherein like numerals designate similar parts throughout the various views, there is disclosed a potato and vine separator which may be attached to any suitable type of harvesting or other agricultural implement, such as that set forth in my co-pending above-identified application. The separator device may be mounted in any suitable manner and preferably in a position slightly inclined to the vertical, whereby potatoes and potato vines may be elevated, the potatoes separated and dropped downwardly while the vines are carried over the top of the device and discharged upon the rear side thereof. The device consists of parallel frame members 10 which are connected together in any convenient manner to form a rigid supporting frame in which are journaled an upper and lower transversely disposed shaft 12 and 14, respectively, which are provided with a plurality of sprocket wheels 16 and 18, respectively, over which are entrained conveyor chains 20 having perpendicularly extending spikes or pins 22.

Figure 2:
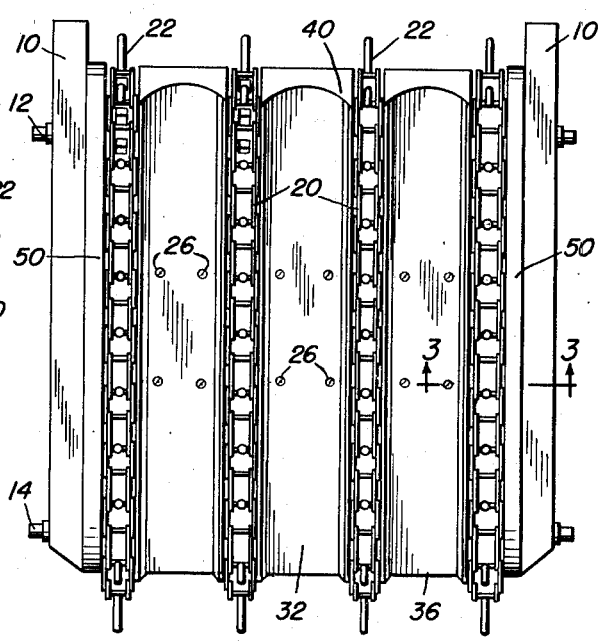
Figure 2 is a front elevational view of the device shown in Figure 1.
Figure 3:
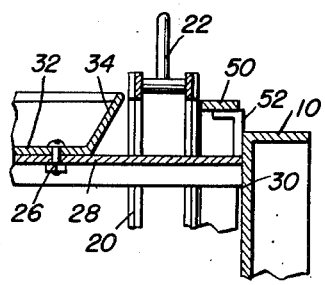
Figure 3 is a fragmentary transverse vertical sectional detail view taken substantially upon the plane of the section line 3—3 of Figure 2 and showing details of assembling parts of the device.
Figure 4:
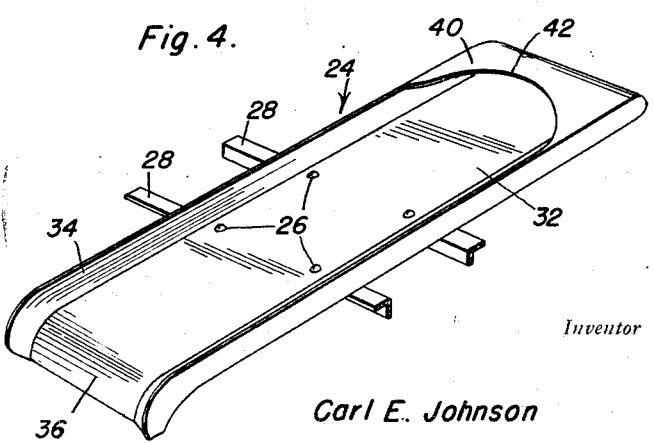
Figure 4 is a perspective view showing one of the potato receiving and delivering chutes.

As will be noted from an inspection of Figure 2, the chains 20 and their attached spikes or pins 22 are disposed in parallel arrangement and are separated by channel or chute members indicated generally at 24, the construction of one of which is shown in perspective in Figure 4. These channel members are secured as by detachable fastening screws 26 to transversely disposed angle iron supporting bars 28 which in turn are welded to the frame members as indicated at 30, see Figure 3. As will be seen by reference to Figure 4, each of the channel members 24 which is preferably formed of sheet metal, consists of a base 32 having inclined integral side walls 34, see Figure 3, and at its lower extremity is downwardly turned or rounded as at 36 to provide a discharge apron or the like, while its upper portion is provided with a transversely disposed cover or bar 40 having an arcuately shaped rim 42 overhanging the bottom surface 32.

The arrangement is such that as the potato vines with potatoes attached are picked up by the spikes 22 of the endless chains 20, and lifted up the inclined surface of the separator, the potatoes being heavier recline upon the inclined bottom wall 32 and are dragged upwardly as the vines move upward upon the device. Upon reaching the top, the depending potatoes are engaged by the striker or knocker plate 40 and their upward travel is arrested while continued movement of the vines serves to separate the latter from the potatoes. The potatoes, then released, are free to descend the inclined surface 32, where they may be gathered or stored in any suitable manner.

The vines are carried over the top of the conveyor and upon the rear side thereof are disengaged from the spikes in a manner to be now set forth.

A curved plate 44 comprising a shield or guard is secured to the rear surface of the vine separator and provided with suitable reenforcing braces 46 for attaching the same to the frame members 10. This plate, as shown in Figure 1, has a curved upper portion 48 extending over the top of the conveyor frame, and is provided with laterally spaced side portions 50 which extend down the front of the separator and are supported by brackets 52 as shown in Figure 3, from the frame members 10. The rear surface 44 is provided with longitudinal slots, not shown, through which the spikes 22 of the rotating chains 20 are adapted to freely slide, as shown in Figure 1. Thus, as the vines are carried over the top, they engage the curved surface of the shield 44, and upon continued rotation of the chains, the vines are gradually withdrawn from the spikes in view of their diverging path of travel therefrom.

In order to enable the device to be adjusted for wear occuring in the chains 20, the frame members 10 are provided adjacent their upper ends with longitudinally extending slots 54 within which is disposed for longitudinally sliding movement relative to the frame members, the upper shaft or axle 12. As shown in Figure 1, the extremities of this shaft are carried by journal blocks 56 which are pivotally secured to an adjusting screw 58 extending through a stationary nut 60 suitably carried by the frame member 10. Consequently, as the screw 50 is adjusted, the journal blocks 56 are moved longitudinally of the frame member 10 to adjust the distance between the shafts 12 and 14, and impart the desired tension to the endless chains 20. When the desired adjustment has been obtained, the journals are locked in their adjusted position by means of fastening bolts 62 carried by the frame members 10 and extending through elongated slots 64 of the journal blocks.

It is contemplated that the endless chains of the vine separator shall be power-driven by any suitable means, not shown, engageable with the lower shaft 14, although if desired, manual operating means of any suitable type may be employed. From the foregoing it is believed that the manner of operating and constructing the device will be readily apparent, and since numerous modifications and equivalents will readily occur to those skilled in the art after a consideration of the foregoing specification and accompanying drawings, it is not intended to limit the invention to the exact construction shown and described. Accordingly, all suitable modifications and equivalents are to be understood as falling within the scope of the invention which is defined in the accompanying claim.

Having described the invention, what is claimed as new is:

In a potato harvester, a vine remover comprising a frame, a pair of spaced parallel transverse shafts rotatably mounted on said frame, sprockets secured to said shafts, endless chains entrained over said sprockets having vine engaging spikes, means for adjustably tensioning said endless chains, channel means between said endless chains, plates overlying said channel means at their ends for arresting travel of potatoes and separating potatoes from said vines, and means for disengaging said conveying means from said vines positioned on the opposite side of said frame from said channel means, said disengaging means comprising a plate inclined to the path of travel of said spikes, said plate being slotted to receive said chains and spikes, and said channel means including chutes, means for securing said chutes to said frame, said chutes comprising a bottom and inclined side walls, one end of said chutes being downwardly curved to provide a discharge apron, said potato arresting plates being positioned at the other end of said chutes and being inturned to overlie said bottom.

CARL E. JOHNSON.

REFERENCES CITED

The following references are of record in the file of this patent:

UNITED STATES PATENTS

| Number | Name | Date |
|---|---|---|
| 660,944 | Bowen | Oct. 30, 1900 |
| 1,132,011 | Horst | Mar. 16, 1915 |
| 1,250,466 | Jockisch | Dec. 18, 1917 |
| 1,348,139 | Horst | July 27, 1920 |
| 2,310,282 | Gauss | Feb. 9, 1943 |

FOREIGN PATENTS

| Number | Country | Date |
|---|---|---|
| 11,121 | Great Britain | July 16, 1890 |